3,336,303
DIBENZO-AZACYCLOALKANE-N-CARBOXYLIC ACID HYDRAZIDES
William E. Coyne and John W. Cusic, Skokie, Ill., assignors to G. D. Searle & Co., Chicago, Ill., a corporation of Delaware
No Drawing. Filed Aug. 11, 1965, Ser. No. 479,011
5 Claims. (Cl. 260—239)

The present invention relates to a group of compounds which are hydrazides of tricyclic N-carboxylic acids. More particularly, the present invention relates to a group of compounds having the following general formula

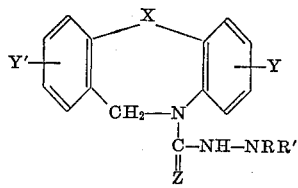

wherein X is selected from the group consisting of a bond connecting the two phenyl rings, methylene, ethylene, and vinylene; Y and Y' are each selected from the group consisting of hydrogen and halogen; Z is selected from the group consisting of O and S; and —NRR' is preferably amino. The halogens referred to above are preferably chlorine. In addition to amino, —NRR' can also represent (lower alkyl)amino, di(lower alkyl)amino, 1-pyrrolidinyl, piperidino, morpholino, and 4-methyl-1-piperazinyl.

Depending on the value assigned to X, the tricyclic nucleus in the above formula can be 5,6-dihydrophenanthridine, 5,6-dihydromorphanthridine, 5,6-dihydrodibenz[b,f]azocine, and 5,6,11,12-tetrahydrodibenz[b,f]azocine.

The compounds of this invention are useful because of their pharmacological properties. In particular, they possess anti-convulsant activity as demonstrated by their antagonism of electroshock seizures. The present compounds also possess analgesic activity.

The compounds of the present invention are conveniently prepared by the reaction of the appropriate hydrazine with a carbonyl chloride of the formula

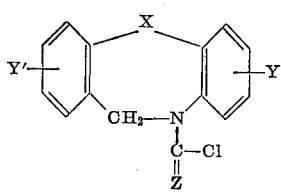

wherein X, Y, Y', and Z are defined as above. The reaction is conveniently carried out at room temperature or below in the presence of a solvent which is essentially inert under the reaction conditions involved.

The carbonyl chlorides referred to above as intermediates are conveniently prepared by the reaction of the appropriate tricyclic amine with phosgene or thiophosgene at ice bath temperature in methylene chlorine solution in the presence of triethylamine.

The following examples are presented to further illustrate the present invention; they should not be construed as limiting it in spirit or in scope. In these examples, quantities are indicated in parts by weight unless parts by volume are specified and temperatures are indicated in degrees centigrade (° C.). The relationship between parts by weight and parts by volume is the same as that existing between grams and milliliters.

EXAMPLE 1

To a stirred solution of 3.6 parts of 100% hydrazine hydrate in 20 parts of absolute ethanol at 5–10° C. is added a solution of 6.4 parts of 5,6-dihydromorphanthridine-5-carbonyl chloride in 100 parts by volume of a 1:1 mixture of ether and methylene chloride. After the addition is complete, the mixture is stirred at room temperature for 2 hours and then filtered. The solvent is evaporated from the filtrate and the resultant residue is dissolved in chloroform and washed with water. The chloroform solution is then dried over magnesium sulfate and the solvent is evaporated to leave a colorless oil which is triturated with petroleum ether to give a white solid. This solid is recrystallized from ethanol to give 5,6-dihydromorphanthridine-5-carboxylic acid hydrazide melting at about 171–175° C. This compound has the following formula

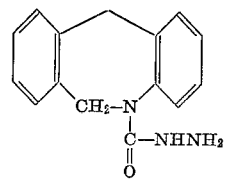

EXAMPLE 2

5.8 parts of 5,6-dihydrophenanthridine-5-carbonyl chloride is reacted with 3.6 parts of 100% hydrazine hydrate according to the procedure described in Example 1. In this case, the product is isolated as the hydrochloride. The product is 5,6-dihydrophenanthridine-5-carboxylic acid hydrazide hydrochloride and it melts at about 183–186° C. with decomposition.

EXAMPLE 3

A solution of 6.6 parts of 5,6-dihydrodibenz[b,f]azocine-5-carbonyl chloride in 200 parts of methylene chloride is added to a stirred solution of 3.7 parts of 100% hydrazine hydrate in 20 parts of absolute ethanol at 5–10° C. The solution is then allowed to warm to room temperature and stirred for 16 hours. The methylene chloride is then evaporated from the solution under reduced pressure and the resultant suspension is treated with 100 parts of water and filtered. The solid is then recrystallized from ethanol to give 5,6-dihydrodibenz[b,f]azocine-5-carboxylic acid hydrazide melting at about 167–168° C. This compound has the following formula

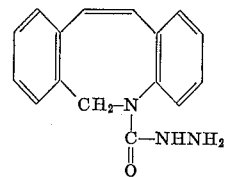

EXAMPLE 4

6.8 parts of 5,6,11,12-tetrahydrodibenz[b,f]azocine-5-carbonyl chloride is reacted with 3.6 parts of 100% hydrazine hydrate according to the procedure described in Example 3. The product, obtained as white crystals melting at about 183–184° C., is 5,6,11,12-tetrahydrodibenz[b,f]azocine-5-carboxylic acid hydrazide.

EXAMPLE 5

To a stirred solution of 3.5 parts of thiophosgene in 25 parts of toluene at 5° C. there is first added 70 parts of ether and then a solution of 5.0 parts of 5,6-dihydromorphanthridine and 3.0 parts of triethylamine in 200 parts of methylene chloride while the temperature is maintained at 5–10° C. The suspension is stirred for 1 hour after the addition is complete; it is then filtered and the solvent is evaporated from the filtrate to leave a dark brown residue. The residue is extracted with 90 parts of hot benzene and the solvent is evaporated from the benzene solution to give crude 5,6-dihydromorphanthridine-5-thiocarbonyl chloride. This crude chloride is dissolved in 100 parts by volume of a 1:1 mixture of ether and methylene chloride and it is added with stirring and cooling to a solution of 3.0 parts of 100% hydrazine hydrate in 15 parts of ethanol. After the addition is complete, the mixture is stirred for 16 hours at room temperature. The organic solvent is then evaporated and the residue is triturated with 100 parts of water and then extracted with chloroform. The chloroform extracts are dried over magnesium sulfate; the solvent is evaporated to give a yellow crystalline product melting at about 163–166° C. This product is 5,6-dihydromorphanthridine-5-thiocarboxylic acid hydrazide. This compound has the following formula

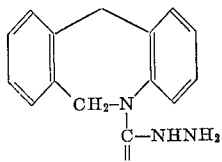

EXAMPLE 6

8-chloro-5,6-dihydromorphanthridine-5-carbonyl chloride, obtained from the reaction of 8-chloro-5,6-dihydromorphanthridine with phosgene, is reacted with 100% hydrazine hydrate according to the procedure described in Example 1. The product obtained is 8-chloro-5,6-dihydromorphanthridine-5-carboxylic acid hydrazide.

EXAMPLE 7

Phenylhydrazine is reacted with 5,6-dihydromorphanthridine-5-carbonyl chloride according to the procedure described in Example 3. The product obtained is 1-(5,6-dihydromorphanthridine-5-carbonyl)-2-phenylhydrazine.

EXAMPLE 8

A solution of 5.2 parts of 5,6-dihydromorphanthridine-5-carbonyl chloride, 2.9 parts of 1-amino-4-methylpiperazine, and 2.9 parts of 1,4-diazabicyclo[2.2.2]-octane in 160 parts of 2-butanone is stirred for 16 hours at room temperature. The resultant mixture is filtered, the solvent is evaporated from the filtrate, and the resultant residue is extracted with ether. The ether extract is washed with water and then dried and the solvent is evaporated to give N - (4-methyl-1-piperazinyl) - 5,6 - dihydromorphanthridine-5-carboxamide.

In a similar manner, 1,1-dimethylhydrazine, 1,1-diethylhydrazine, 1-aminopiperidine, and 4-aminomorpholine are each reacted with 5,6-dihydromorphanthridine-5-carbonyl chloride to give the corresponding hydrazide in each instance.

What is claimed is:

1. A compound of the formula

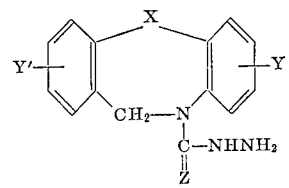

wherein X is selected from the group consisting of a bond connecting the two phenyl rings, methylene, ethylene, and vinylene; Y and Y' are each selected from the group consisting of hydrogen and chlorine; and Z is selected from the group consisting of O and S.

2. 5,6-dihydrophenanthridine-5-carboxylic acid hydrazide.

3. 5,6-dihydromorphanthridine-5-carboxylic acid hydrazide.

4. 5,6 - dihydromorphanthridine-5-thiocarboxylic acid hydrazide.

5. 5,6,11,12-tetrahydrodibenz[b,f]azocine - 5 - carboxylic acid hydrazide.

No references cited.

ALEX MAZEL, *Primary Examiner.*

ALTON D. ROLLINS, *Assistant Examiner.*